UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

VAT COLORING-MATTERS AND PROCESS OF MAKING THEM.

1,201,968.     Specification of Letters Patent.     Patented Oct. 17, 1916.

No Drawing.     Application filed February 11, 1914. Serial No. 818,131.

*To all whom it may concern:*

Be it known that I, MAX HENRY ISLER, a citizen of the Swiss Republic, residing at Mannheim, Germany, have invented new and useful Improvements in Vat Coloring-Matters and Processes of Making Them, of which the following is a specification.

The specification of Patent No. 1,093,427, describes the production of intermediate products, which also possess coloring properties, by the oxidization of di-benzanthrone for instance, with manganese di-oxid and sulfuric acid. There it has been also described that the said oxidation products can be subjected to subsequent reduction. Further it has been found that green coloring matters can be produced by heating the aforesaid oxidation products of di-benzanthrone described in the specification of Patent No. 1,093,427 (either without or after the said reduction thereof) to a temperature above 100° C. while avoiding the presence of an oxidizing agent, either alone or preferably in the presence of a solvent or suspension agent or a suitable condensing agent.

I have now found that the said green vat coloring matters can be treated with bromin and thus be converted into the new vat coloring matters possessing valuable properties. The said green vat coloring matters can be treated with bromin, either after or during their production—*i. e.* by heating as above described the oxidation products of di-benzanthrone. In carrying out the process of my invention the said green vat coloring matters can be employed whether they are produced by heating directly the original oxidation products of di-benzanthrone or by heating the oxidation products of di-benzanthrone after the reduction thereof, and in both cases the same products are obtained.

My new vat coloring matters are characterized by consisting when dry of green powders which are insoluble in water and in dilute acids and alkalis, but yield red-violet solutions in concentrated sulfuric acid. They contain bromin and are free from nitrogen. With alkaline hydrosulfite they yield blue vats which dye cotton green.

The following examples will serve to illustrate further the nature of my invention which, however, is not confined to these examples. The parts are by weight.

*Example 1.*—Suspend 100 parts of the green vat coloring matter (obtainable by heating 10 parts of the oxidation product, obtained according to either of the Examples 1 and 2 of the Patent No. 1,093,427 for instance in 100 parts of paratoluidin and with 5 parts of dry anhydrous boric acid, either at 160° C. or at boiling point, until a test portion shows that no unaltered initial material is present, and then removing the para-toluidin) in 500 parts of nitrobenzene or trichlorbenzene, add 200 parts of bromin and then heat for a few hours, while maintaining the oil-bath at about 180° C. Then isolate the coloring matter by filtration with the aid of the pump. On dyeing cotton with the resulting product, somewhat more yellowish shades of green are obtained than those produced by the initial product.

*Example 2.*—Treat 100 parts of either of the products obtainable according to the specification of the aforesaid Patent No. 1,093,427, with 500 parts of nitrobenzene or trichlorbenzene, 20 to 40 parts of anhydrous boric acid and 100 parts of bromin as described in the foregoing example. Then isolate the coloring matter by filtration.

Now what I claim is:—

1. The process of producing vat coloring matters by treating with bromin the coloring matters obtainable by heating to a temperature above 100° C., and while avoiding the presence of an oxidizing agent, the compound obtainable by oxidizing di-benzanthrone.

2. The new coloring matters which can be obtained by brominating the coloring matters obtainable by heating an oxidized di-benzanthrone, which new coloring matters consist when dry of green powders, are insoluble in water and in dilute acids and alkalis, but are soluble in concentrated sulfuric acid giving red-violet solutions, and which are free from nitrogen, but contain bromin and which with alkali hydrosulfite yield blue vats and dye cotton green.

In testimony whereof I have hereunto set my hand in the presence of two subscribing witnesses.

MAX HENRY ISLER.

Witnesses:
J. ALEC. LLOYD,
S. S. BERGER.